US012555512B2

(12) United States Patent
Chen

(10) Patent No.: US 12,555,512 B2
(45) Date of Patent: Feb. 17, 2026

(54) DISPLAY PANEL AND METHOD OF CONTROLLING SAME BASED ON CORRESPONDENCE BETWEEN COMPOSITE SIGNALS AND PIXELS

(71) Applicant: TCL China Star Optoelectronics Technology Co., Ltd., Shenzhen (CN)

(72) Inventor: Yinhung Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/769,746

(22) PCT Filed: Mar. 25, 2022

(86) PCT No.: PCT/CN2022/083084
§ 371 (c)(1),
(2) Date: Nov. 16, 2024

(87) PCT Pub. No.: WO2023/173464
PCT Pub. Date: Sep. 21, 2023

(65) Prior Publication Data

US 2025/0069540 A1 Feb. 27, 2025

(30) Foreign Application Priority Data

Mar. 17, 2022 (CN) ......................... 202210267236.6

(51) Int. Cl.

| | |
|---|---|
| ***G09G 3/20*** | (2006.01) |
| ***G09G 3/32*** | (2016.01) |
| ***G09G 3/3225*** | (2016.01) |

(52) U.S. Cl.
CPC ............. *G09G 3/2096* (2013.01); *G09G 3/32* (2013.01); *G09G 3/3225* (2013.01); *G09G 2310/0286* (2013.01); *G09G 2370/08* (2013.01)

(58) Field of Classification Search
None
See application file for complete search history.

(56) References Cited

U.S. PATENT DOCUMENTS 6,188,377 B1 2/2001 Campbell et al.

FOREIGN PATENT DOCUMENTS

| | | |
|---|---|---|
| CN | 1848210 A | 10/2006 |
| CN | 103021310 A | 4/2013 |
| CN | 103870143 A | 6/2014 |

(Continued)

OTHER PUBLICATIONS

Machine Translation of CN 113495377 A (Year: 2025).*

(Continued)

*Primary Examiner* — Gustavo Polo
(74) *Attorney, Agent, or Firm* — Nathan & Associates Patent Agents Ltd.; Menachem Nathan

(57) ABSTRACT

A display panel and a method of controlling a same are disclosed. The method includes following steps: generating a composite signal, wherein the composite signal includes a plurality of composite messages, each of the composite messages includes a first sub-message and a second sub-message, and the first sub-messages of the composite messages and a plurality of pixel groups of the display panel have a one-to-one correspondence; and recognizing each of the first messages to load the corresponding second sub-messages to the corresponding pixel groups.

13 Claims, 13 Drawing Sheets

(56) References Cited

FOREIGN PATENT DOCUMENTS

| | | | |
|---|---|---|---|
| CN | 104851410 | A | 8/2015 |
| CN | 113495377 | A | 10/2021 |

OTHER PUBLICATIONS

International Search Report in International application No. PCT/CN2022/083084,mailed on Nov. 30, 2022.

Written Opinion of the International Search Authority in International application No. PCT/CN2022/083084,mailed on Nov. 30, 2022.

* cited by examiner

DISPLAY PANEL AND METHOD OF CONTROLLING SAME BASED ON CORRESPONDENCE BETWEEN COMPOSITE SIGNALS AND PIXELS

TECHNICAL FIELD

The present disclosure relates to a field of display technologies, more particularly, to a field of manufacturing display panels, and more particularly, to a display panel and a method of controlling a same.

BACKGROUND

With developments of light-emitting diode (LED) technologies, mini LEDs and micro LEDs, which are manufactured by micro miniaturization technologies and matrixing technologies, have been launched. Mini LEDs and micro LEDs have advantages of high brightness, high luminescent efficiency, and a thin and light body.

In driving structures of LEDs, mini LEDs, and micro LEDs, generally, at least one switch element is correspondingly disposed in each sub-pixel. Multiple switch elements are turned on by rows by cooperation between a gate driving circuit and a gate line, thereby transmitting a data signal to multiple corresponding sub-pixels to realize a luminescent function. However, this leads to a complicated circuit and elements densely distributed in the circuit, which increases cost for manufacturing driving structures of LEDs, mini LEDs, or micro LEDs.

Therefore, it is urgent to provide a display panel to reduce cost for manufacturing driving structures of LEDs, mini LEDs, or micro LEDs.

SUMMARY

Technical Problem

Embodiments of the present disclosure provide a display panel and a method controlling a same to solve a following technical issue: cost for manufacturing driving structures of LEDs, mini LEDs, or micro LEDs are high.

Solutions to the Technical Problem

Technical Solutions

The present disclosure provides a method of controlling a display panel, comprising following steps:

- generating a composite signal, wherein the composite signal comprises a plurality of composite messages, each of the composite messages comprises a first sub-message and a second sub-message, and the first sub-messages of the composite messages and a plurality of pixel groups of the display panel have a one-to-one correspondence; and
- recognizing each of the first sub-messages to load the corresponding second sub-messages to the corresponding pixel groups.

Advantageous Effects of the Present Disclosure

Advantageous Effects

The present disclosure provides a display panel and a method of controlling a same. The method includes following steps: generating a composite signal, wherein the composite signal includes a plurality of composite messages, each of the composite messages includes a sub-message and a second sub-message, and first sub-messages of the composite messages and a plurality of pixel groups of the display panel have a one-to-one correspondence; and recognizing each of the first messages to load the corresponding second sub-messages to the corresponding pixel groups. In the present disclosure, the composite messages including the first sub-messages and the second sub-messages having a one-to-one correspondence with the sub-pixels are generated, and the second sub-messages are loaded to the corresponding sub-pixels according to the first sub-messages. Therefore, a gate driving circuit, a gate line, and a transistor electrically connected to the gate line can be omitted, thereby simplifying a driving structure of the sub-pixels in the display panel and reducing a density of elements distributed in the driving structure. As such, cost for manufacturing the driving structure of the sub-pixels of the display panel is reduced.

BRIEF DESCRIPTION OF DRAWINGS

Description of Drawings

The present disclosure is illustrated below with reference to appended drawings. It should be noted that the appended drawings below are merely used to illustrate some embodiment of the present disclosure, from which those skilled in the art can derive further figures without making any inventive efforts.

Figure 1:
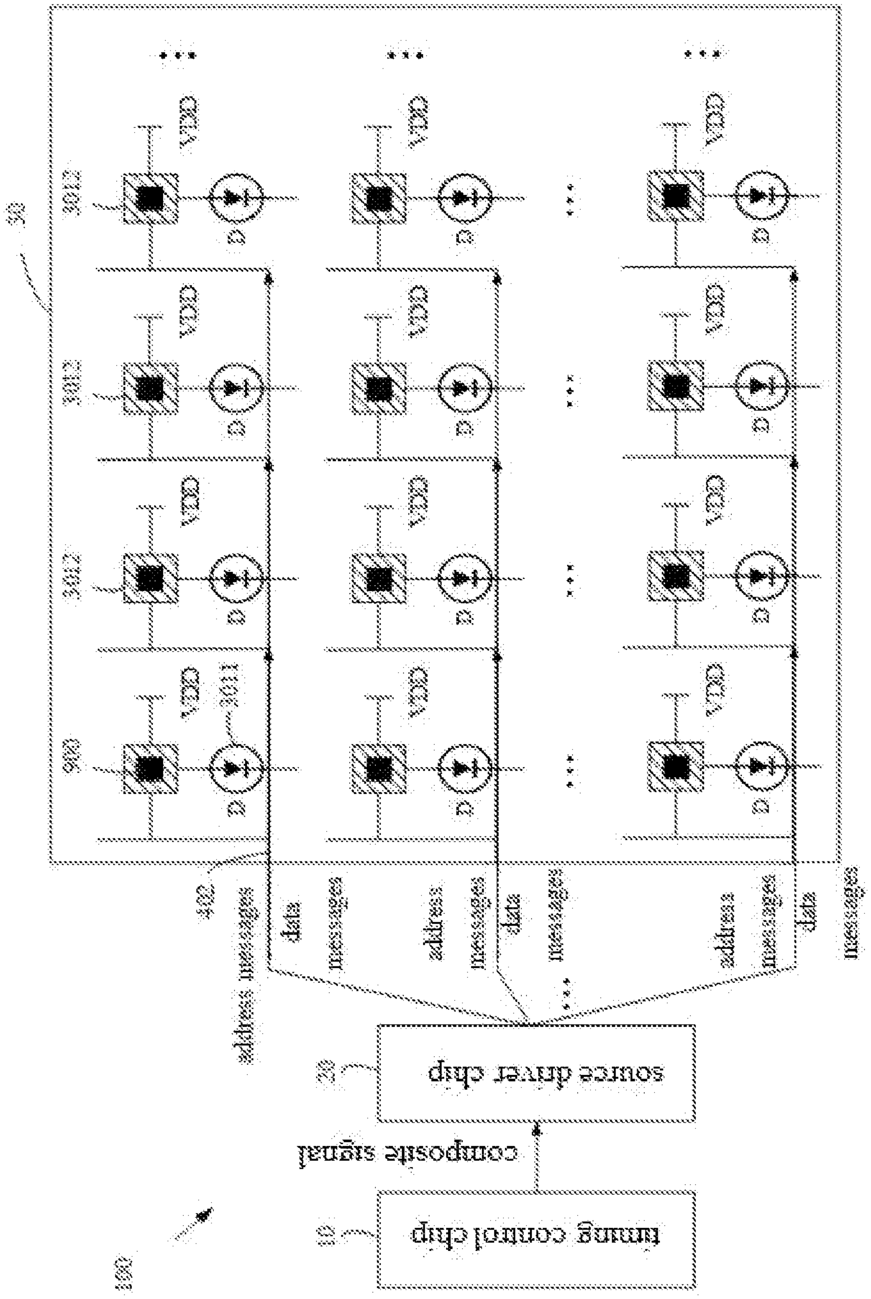

FIG. 1 is a structural schematic view showing a first display panel provided by an embodiment of the present disclosure.

Figure 2:
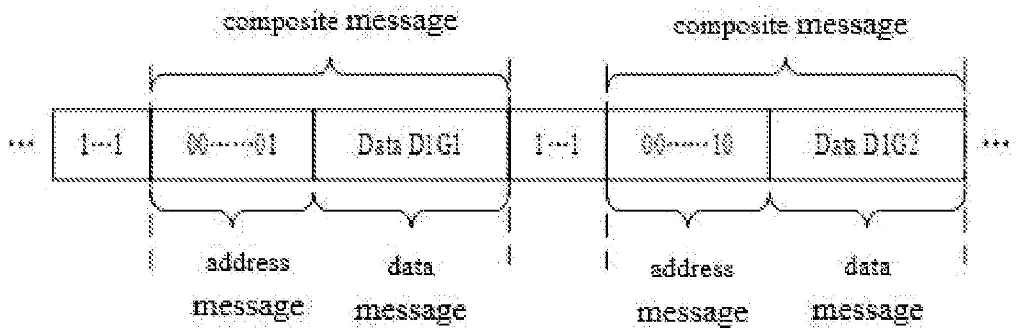

FIG. 2 is a structural schematic view showing a first composite signal provided by the embodiment of the present disclosure.

Figure 3:
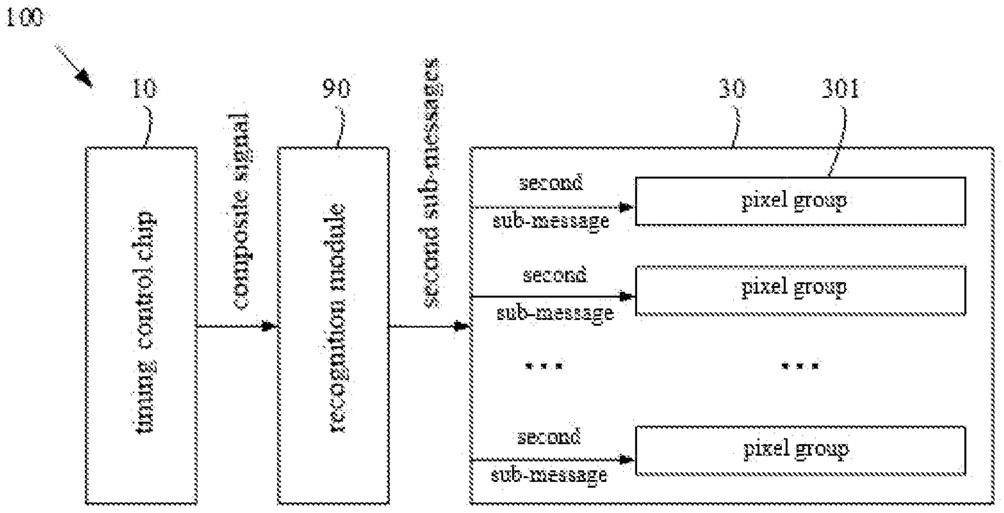

FIG. 3 is a structural schematic view showing a second display panel provided by an embodiment of the present disclosure.

Figure 4:
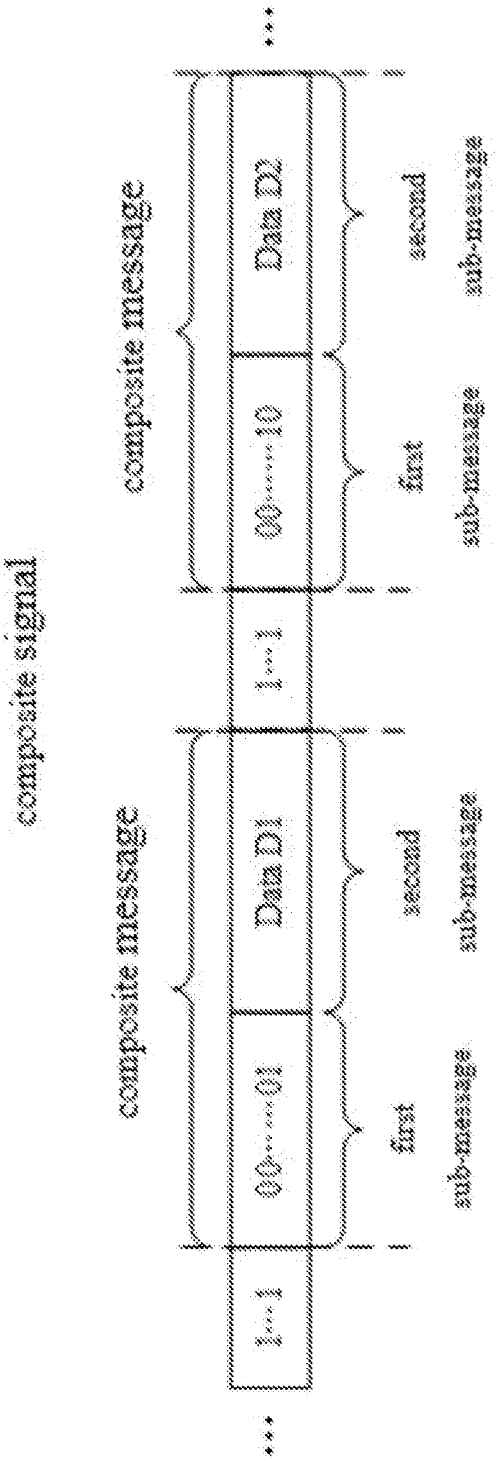

FIG. 4 is a structural schematic view showing a second composite signal provided by an embodiment of the present disclosure.

Figure 5:
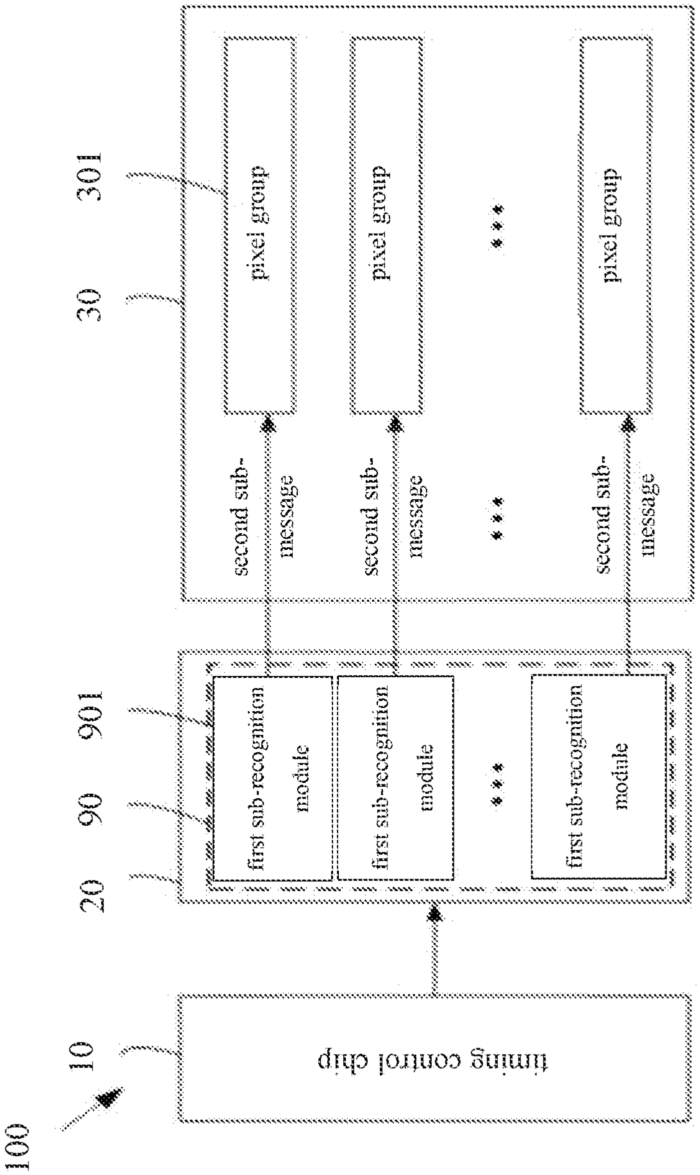

FIG. 5 is a structural schematic view showing a third display panel provided by the embodiment of the present disclosure.

Figure 6:
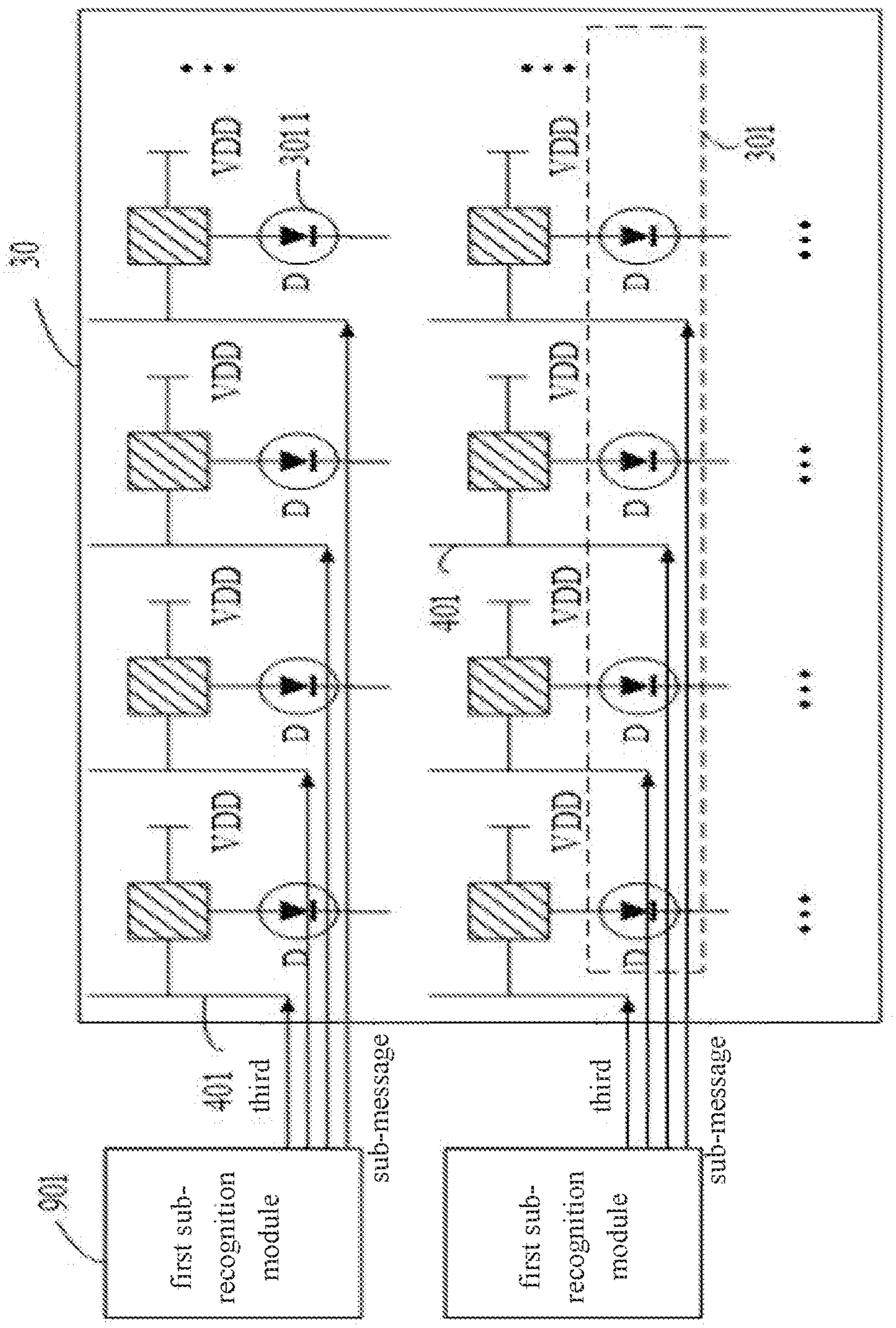

FIG. 6 is a structural schematic view showing a fourth display panel provided by an embodiment of the present disclosure.

Figure 7:
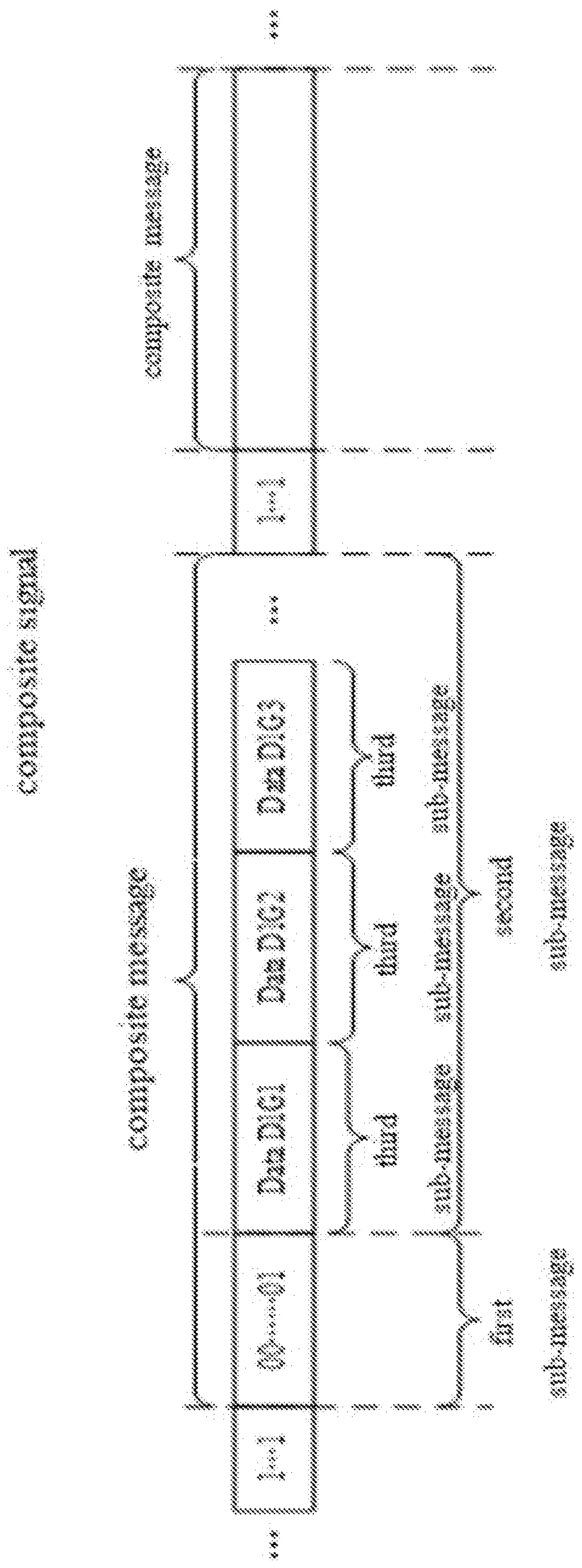

FIG. 7 is a structural schematic view showing a third composite signal provided by the embodiment of the present disclosure.

Figure 8:
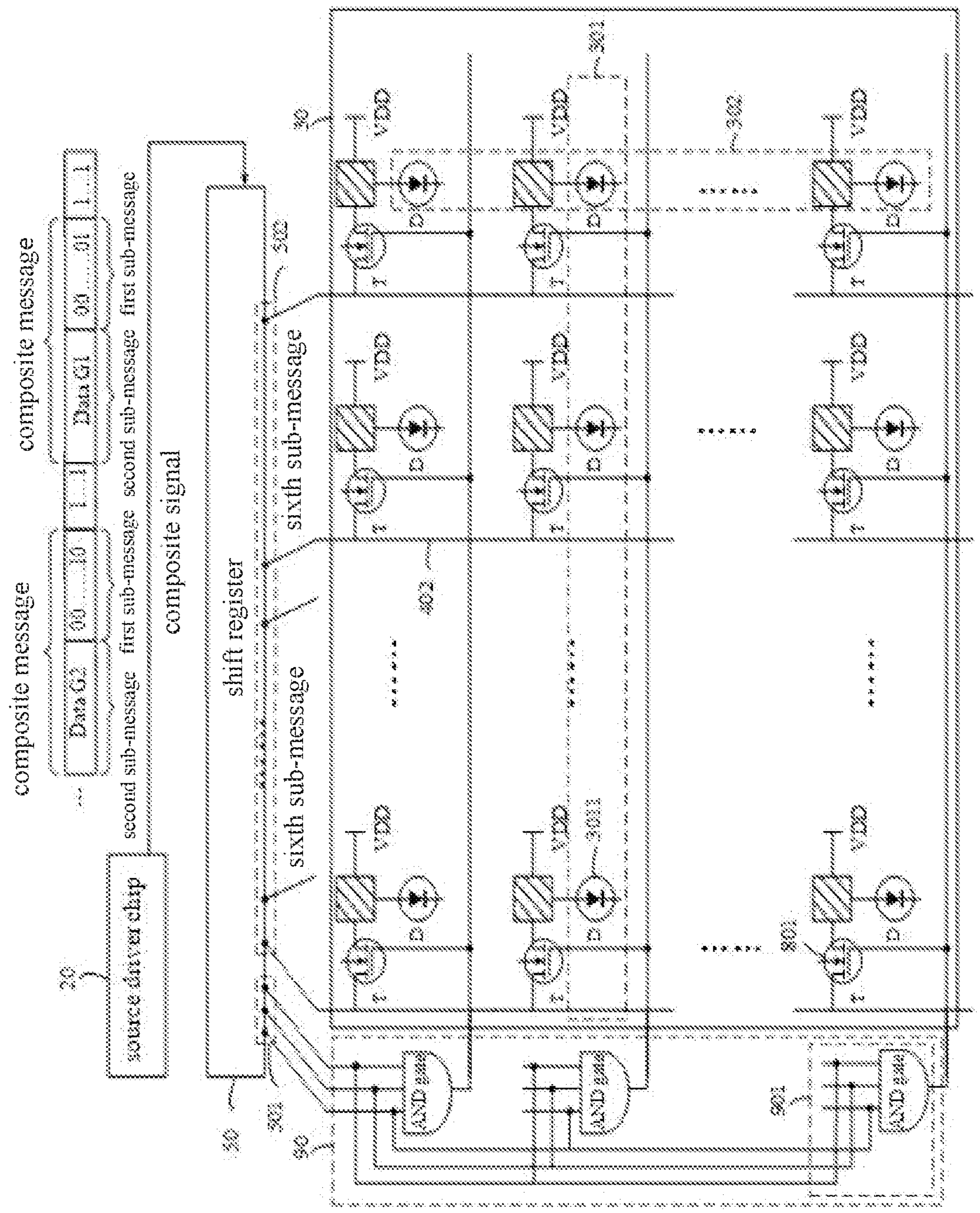

FIG. 8 is a structural schematic view showing a fifth display panel provided by an embodiment of the present disclosure.

Figure 9:
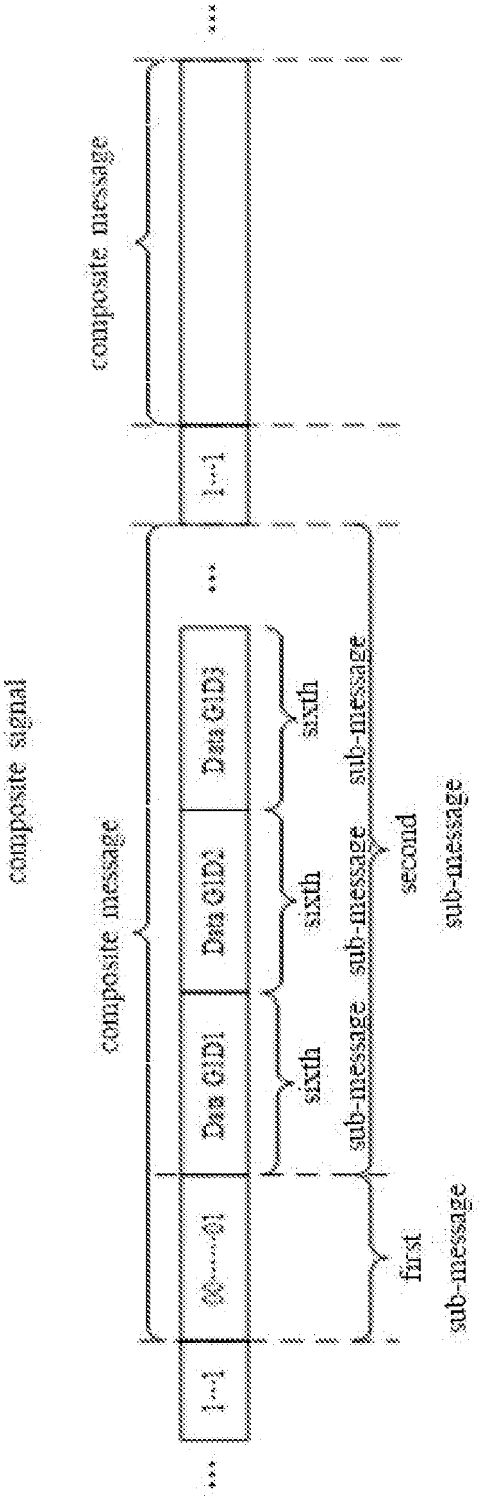

FIG. 9 is a structural schematic view showing a fourth composite signal provided by the embodiment of the present disclosure.

Figure 10:
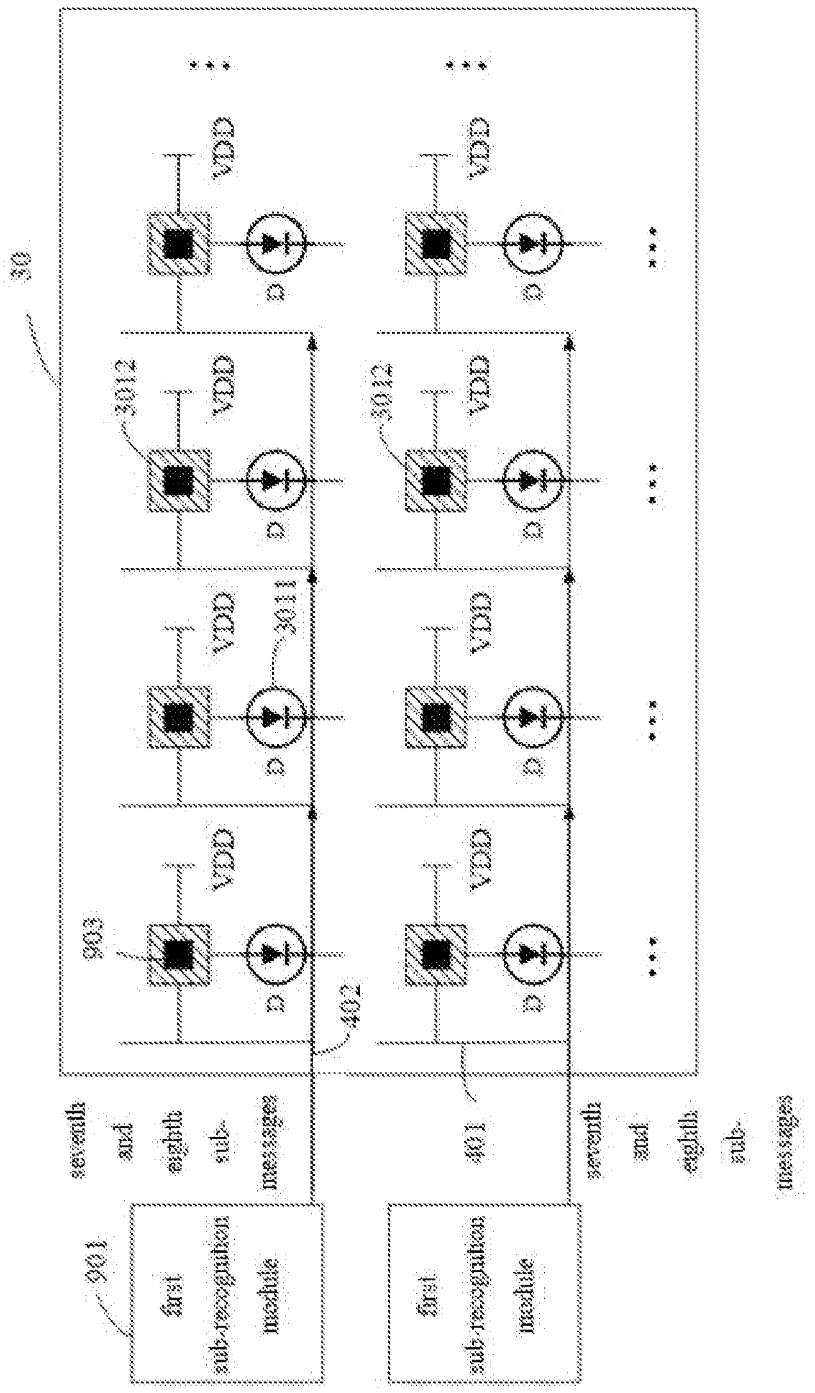

FIG. 10 is a structural schematic view showing a sixth display panel provided by an embodiment of the present disclosure.

Figure 11:
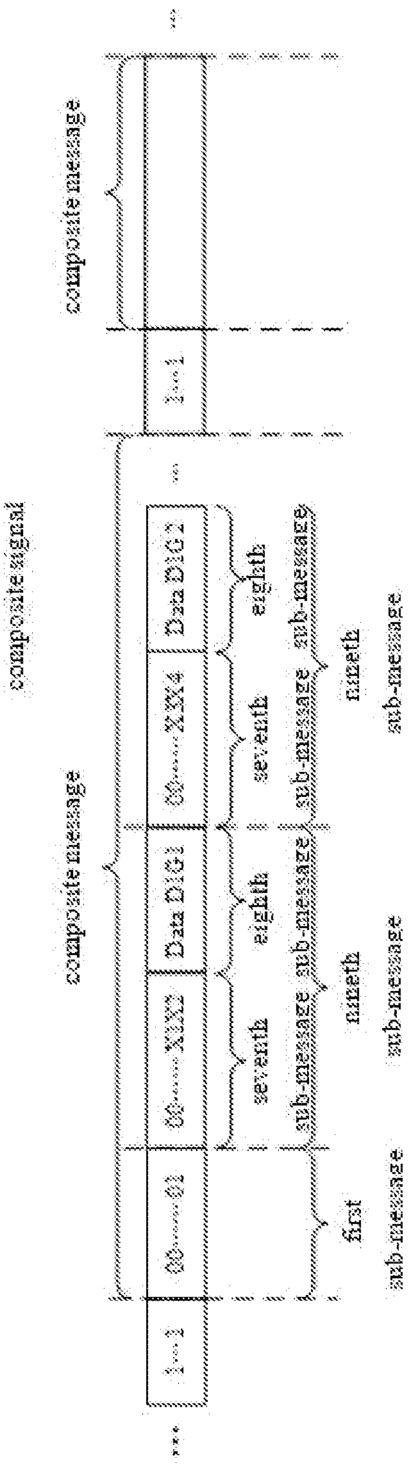

FIG. 11 is a structural schematic view showing a fifth composite signal provided by the embodiment of the present disclosure.

Figure 12:
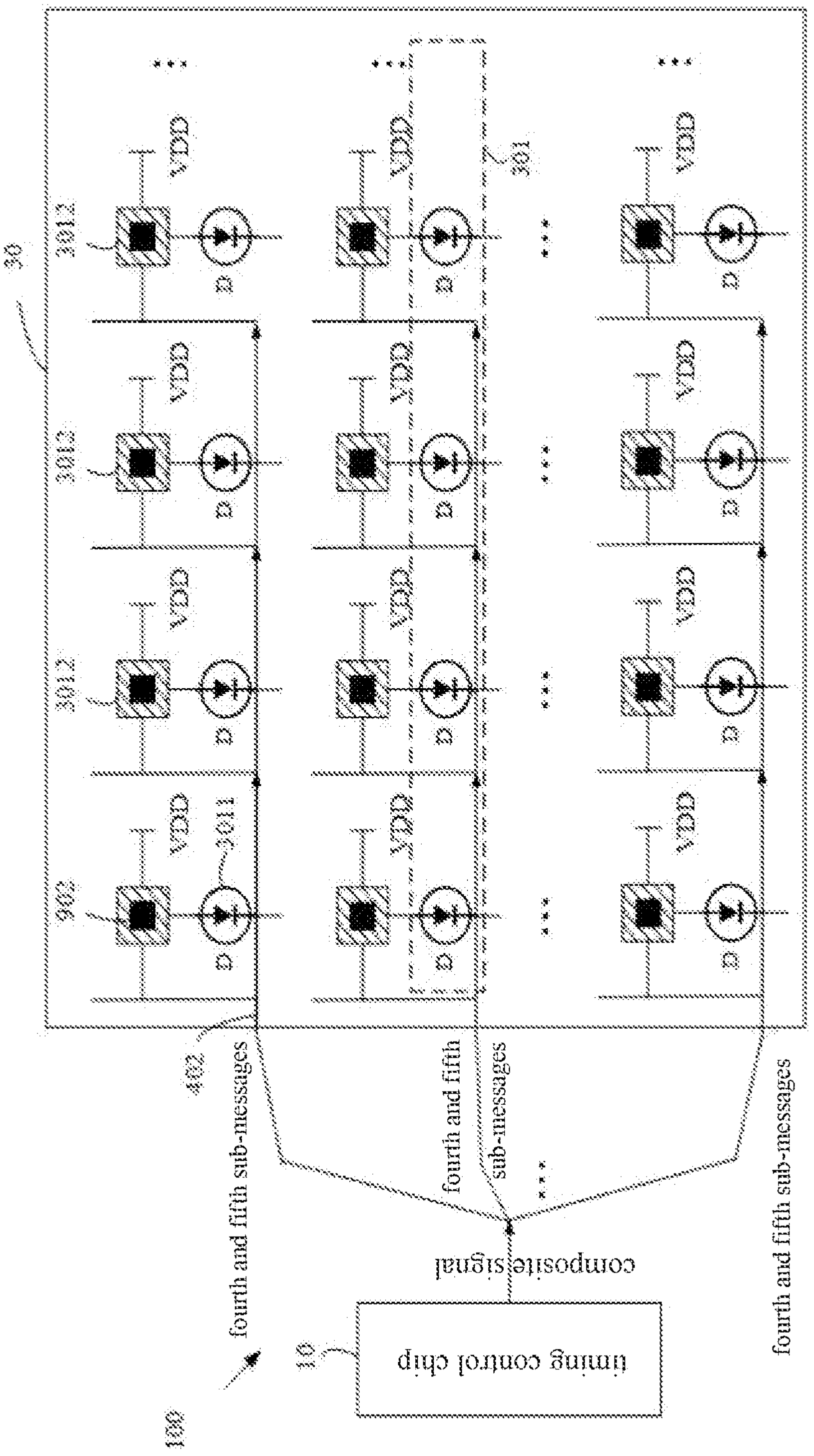

FIG. 12 is a structural schematic view showing a seventh display panel provided by an embodiment of the present disclosure.

Figure 13:
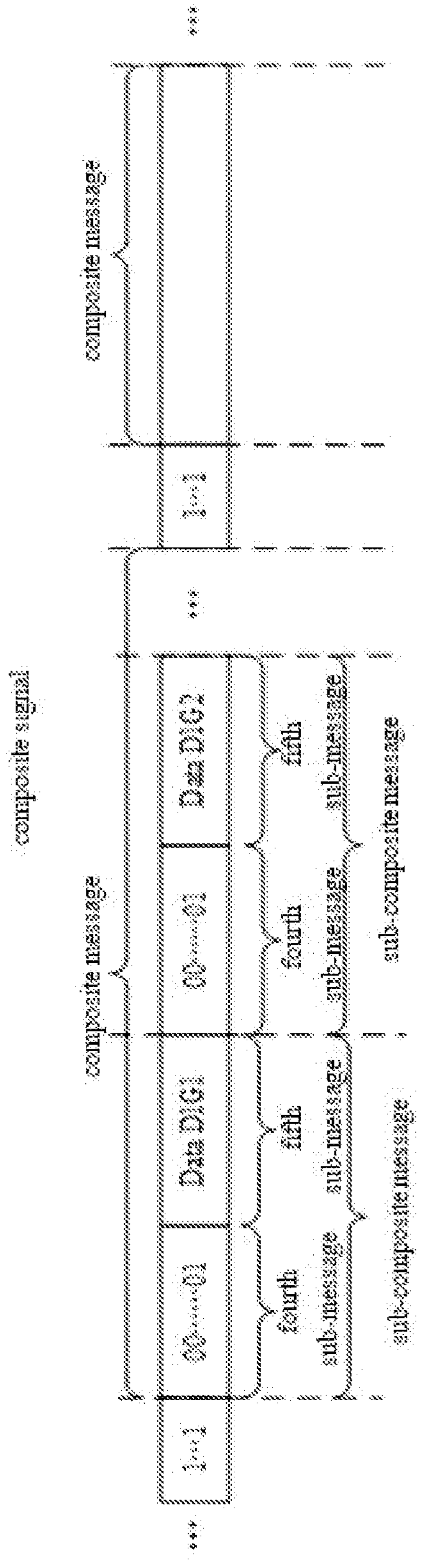

FIG. 13 is a structural schematic view showing a sixth composite signal provided by the embodiment of the present disclosure.

Figure 14:
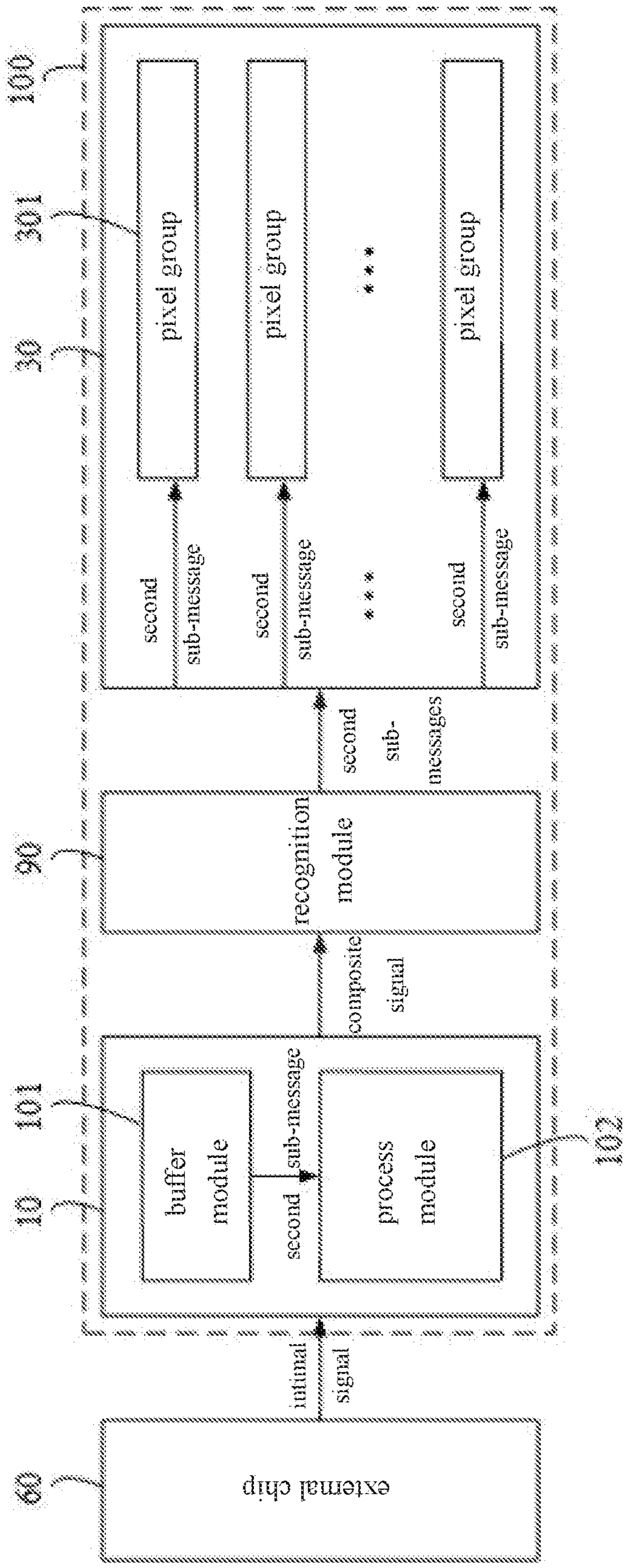

FIG. 14 is a structural schematic view showing an eighth display panel provided by an embodiment of the present disclosure.

EXAMPLES

Detailed Description

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

Terms "first", "second", "third", "fourth", etc. in the specification and claims of the present disclosure and the above figures are used to distinguish similar objects, but are not used to describe a specific order. It should be noted that the objects can be interchanged in an appropriate case. In addition, terms "comprising" and "including" and any variants thereof are intended to cover non-exclusive inclusions. For example, a process, a method, a system, a product, or an apparatus comprising a series of steps of modules are not limited to only comprise the listed steps or modules, and may further optionally include steps or modules not listed. Alternatively, other steps or modules comprising the process, the method, the product, or the apparatus may further optionally be included.

Specific features, structures, and characteristics, which are mentioned in the present disclosure may be included in at least one embodiment. Phrases in the present disclosure are not necessary to refer to the same embodiment and do not refer to an independent embodiment and an alternative embodiment which are exclusive to other embodiments. It should be explicitly and implicitly understood by those skilled in the art that embodiments described in the present disclosure may be combined with other embodiments.

An embodiment of the present disclosure provides a display panel. The display panel includes, but is not limited to, following embodiments and a combination thereof.

In one embodiment, as shown in FIG. 1, a display panel 100 includes: a timing control chip 10 configured to generate a composite signal, wherein, as shown in FIG. 2, the composite signal includes a plurality of composite messages, and each of the composite messages includes an address message and a data message; a source driver chip 20 electrically connected to the timing control chip 10 to obtain the composite signal: a main panel body 30 including a plurality of sub-pixels 3011 and a plurality of pixel driver chips 3012 having a one-to-one correspondence, and each of the pixel driver chips 3012 is electrically connected between the corresponding sub-pixel 3011 and the source driver chip 20. Each of the pixel driver chips 3012 recognizes the corresponding address message to allow each of the sub-pixels 3011 to load the corresponding data message.

As shown in FIG. 1, the sub-pixels 3011 may be arranged in an array manner. Each of the sub-pixels 3011 may include, but are not limited to, organic light-emitting diodes (OLEDs), light-emitting diodes (LEDs), mini LEDs, or micro LEDs. Each of the pixel driver chips 3012 may include a corresponding pixel driving circuit. Each of the pixel driving circuits may include a corresponding circuit and a corresponding element. Furthermore, each of the pixel driving circuits may further be electrically connected to a working signal VDD, thereby ensuring that the pixel driver chips 3012 can work normally. Please refer to FIG. 1 and FIG. 2 together, the composite messages and the sub-pixels 3011 may have a one-to-one correspondence. Furthermore, the address message of each of the composite messages may denote an address of one of the corresponding sub-pixels 3011. The data message of each of the composite messages may be understood as a relevant voltage value that needs to be applied to one of the corresponding sub-pixels 3011 in one frame. For example, "00 . . . 01" may denote an address of the sub-pixel 3011 in a first row and a first column. Correspondingly, "Data D1G1" may denote a relevant voltage value that needs to be applied to the sub-pixel 3011 in the first row and the first column. "00 . . . 10" may denote an address of the sub-pixel 3011 in the first row and the second column. Correspondingly, "Data D1G2" may denote a relevant voltage value that needs to be applied to the sub-pixel 3011 in the first row and the second column.

Specifically, in the present embodiment, the timing control chip 10 generates the composite signal which includes a plurality of address messages and a plurality of data messages having a one-to-one correspondence with the sub-pixels 3011. As shown in FIG. 2, each of the sub-pixels 3011 may be electrically connected to the source driver chip 20 by a data line 402. The composite signal may be transmitted to the pixel driver chip 3012 by the source driver chip 20 and multiple data lines 402. Furthermore, a sub-recognition module 900 of each of the pixel driver chips 3012 may compare the address messages with a plurality of pre-stored addresses. If the address messages transmitted to the sub-recognition module 900 and the pre-stored addresses are a same, the sub-recognition module 900 may load the corresponding data messages to the corresponding sub-pixels. Of course, the present disclosure is not limited to the above description. A method to electrically connect the pixel driver chips 3012 and the source driver chips 20 is not limited to the present embodiment. Each of the pixel driver chips 3012 and the source driver chips 20 can be connected to each other by conductive line. Alternatively, Two adjacent pixel driver chips 3012 in a same row or a same column may be connected to each other by a conductive line, and the pixel driver chips 3012 and the source driver chips 20 are connected to each other by another conductive line. Alternatively, all of the pixel driver chips 3012 may be connected to each other by a conductive line, and the pixel driver chips 3012 and the source driver chips 20 are connected to each other by another conductive line.

It should be understood that, in the present embodiment, the timing control chip 10 generates the composite signal including the address messages and the data messages having a one-to-one correspondence with the sub-pixels 3011, and each of the sub-recognition modules 900 can receive and recognize the address messages of the composite signal to load the corresponding data messages to the corresponding sub-pixels 3011. Therefore, a gate driving circuit, a gate line, and a transistor electrically connected to the gate line can be omitted, thereby simplifying a driving structure of the sub-pixels 3011 in the display panel 100 and reducing a density of elements distributed in the driving structure. As such, cost for manufacturing the driving structure of the sub-pixels 3011 of the display panel 100 is reduced.

An embodiment of the present disclosure further provides a method of controlling a display panel. The method of controlling the display panel includes, but is not limited to, following steps or a combination thereof: generating a composite signal, wherein the composite signal includes a plurality of composite messages, each of the composite messages includes a first sub-message and a second sub-message, and the first sub-messages of the composite messages and a plurality of pixel groups of the display panel have a one-to-one correspondence; and recognizing each of the first sub-messages to load the corresponding second sub-messages to the corresponding pixel groups. Specifically, the method of controlling the display panel can be understood according to the above description regarding FIG. 1 and FIG. 2.

In one embodiment, as shown in FIG. 3, a display panel 100 includes: a timing control chip 10, wherein the timing control chip 10 is configured to generate a composite signal, as shown in FIG. 4, the composite signal includes a plurality of composite messages, and each of the composite messages includes a first sub-message and a second sub-message having a one to one correspondence; a main panel body 30, wherein the main panel body 30 includes a plurality of pixel groups 301, and the pixel groups 301 and the first sub-messages of the composite messages have a one-to-one correspondence; and a recognition module 90, wherein the recognition module 90 is electrically connected between the timing control chip 10 and the main panel body 30 to obtain the composite signal, and the recognition module 90 recognizes each of the first sub-messages to load the corresponding second sub-messages to the pixel groups 301.

As shown in FIG. 3, the pixel groups 301 may be arranged along a first direction or a second direction. The first direction may be parallel to a lateral edge of the display panel, and the second direction may be parallel to another lateral edge of the display panel 100. Please refer to FIG. 3 and FIG. 4 together, the composite messages and the pixel groups 301 may have a one-to-one correspondence. Furthermore, the first sub-message of each of the composite messages may denote an address of one of the corresponding pixel groups 301, and the second sub-message of each of the composite messages may be understood as a relevant voltage value that needs to be applied to the corresponding sub-pixels 301 in one frame. For example, "00 . . . 01" may denote an address of the sub-pixel 301 in a first row. Correspondingly, "Data D1" may denote data of the pixel group 301 in the first row. "00 . . . 10" may denote an address of the sub-pixel 301 in a second row. Correspondingly. "Data D2" may denote data of the pixel group 301 in the second row.

Specifically, in the present embodiment, the timing control chip 10 generates the composite signal which includes the address messages and the data messages having a one-to-one correspondence with the sub-pixels 301. The composite signal may be transmitted to the recognition module 90 by a source driver chip 20. Furthermore, the recognition module 90 is electrically connected between the timing control chip 10 and the main panel body 30, thereby connecting the recognition module 90 with the pixel groups 301 and pre-storing an address message base to load the corresponding second sub-messages to the corresponding pixel groups 301. Specifically, in the present embodiment, a specific location and a specific structure of the recognition module 90 are not limited. The present embodiment only intends to describe a recognition function of the recognition module 90.

It should be understood that, in the present embodiment, the timing control chip 10 generates the composite signal including the address messages and the data messages having a one-to-one correspondence with the sub-pixels 301. The recognition module 90 compares the first sub-messages with the pre-stored address message base, thereby loading the corresponding second sub-messages to the corresponding pixel groups 301. Therefore, a gate driving circuit, a gate line, and a transistor electrically connected to the gate line can be omitted, thereby simplifying a driving structure of the sub-pixels 3011 in the display panel 100 and reducing a density of elements distributed in the driving structure. As such, cost for manufacturing the driving structure of the sub-pixels 3011 of the display panel 100 is reduced.

In one embodiment, as shown in FIG. 4 and FIG. 5, each of the recognition modules 90 includes a plurality of first sub-recognitions 901 electrically connected to the timing control chip 10. The first sub-recognition modules 901, the composite messages, and the pixel groups 301 have a one-to-one correspondence. Each of the first sub-recognition modules 901 is electrically connected to the corresponding pixel group 301. Each of the first sub-recognition modules 901 recognizes each of the first sub-messages to load the corresponding second sub-messages to the pixel groups.

Specifically, please refer to FIG. 4 and FIG. 5 together, each of the first sub-recognitions 901 may compare the first sub-messages of the composite signal with the pre-stored address messages. The pre-stored address messages of each of the first sub-recognition modules 901 are address messages of the corresponding pixel groups 301. If the first sub-messages transmitted to the first sub-recognition modules 901 and the pre-stored address messages are a same, the first sub-recognition modules 901 may load the corresponding second sub-messages to the corresponding pixel groups 301. It should be understood that, in the present embodiment, the timing control chip 10 generates the composite signal including the address messages and the data messages having a one-to-one correspondence with the sub-pixels 301. The recognition module 90 compares the first sub-messages with the pre-stored address message base, thereby loading the corresponding second sub-message to the corresponding pixel groups 301. Therefore, a gate driving circuit, a gate line, and a transistor electrically connected to the gate line can be omitted, thereby simplifying a driving structure of the sub-pixels 3011 in the display panel 100 and reducing a density of elements distributed in the driving structure. As such, cost for manufacturing the driving structure of the sub-pixels 3011 of the display panel 100 is reduced.

In one embodiment, as shown in FIG. 6, the main panel body 30 further includes: a plurality of sub data lines 401, wherein each of the pixel groups 301 includes a plurality of sub-pixels 3011, and the sub-data lines 401 and the sub-pixels 3011 of the pixel groups 301 have a one-to-one correspondence. As shown in FIG. 7, each of the second sub-messages includes a plurality of third sub-messages. The third sub-messages of the sub-pixels 3011 of the pixel groups 301 have a one-to-one correspondence. Each of the first sub-recognition modules 901 is electrically connected to the corresponding sub-data line 401, thereby loading the third sub-messages to the corresponding sub-pixels 3011 according to first sub-messages.

Specifically, as shown in FIG. 6, the sub-data lines 401 extending along a horizontal direction and arranged along vertical direction are taken as an example. Each of the first recognition modules 901 may include a plurality of output ends which have a one-to-one correspondence with the sub-pixels 3011 of the corresponding pixel groups 301. The first sub-recognition modules 901 can output the third sub-messages of the second sub-messages corresponding to sub-pixels 3011 of the pixel groups 301. Furthermore, please refer to FIG. 6 and FIG. 7 together, each of the output ends of each of the first sub-recognition modules 901 may be electrically connected between the corresponding sub-pixels 3011, thereby loading the corresponding third sub-messages to the corresponding sub-pixels 3011. For example, in the first sub-recognition modules 901 electrically connected to the pixel groups 301 in a first row, a first output end of the first sub-recognition modules 901 may transmit "Data D1G1" to the sub-pixels 3011 in the first row and a first column, and a second output end of the first sub-recognition modules 901 may transmit "Data D1G2" to the sub-pixels 3011 in the first row and a second column.

In one embodiment, as shown in FIG. 8, the display panel 100 further includes: the source driver chip 20, wherein the source driver chip 20 is electrically connected between the timing control chip 10 and the main panel body 30; a plurality of switch elements 801, wherein each of the pixel groups 301 includes the sub-pixels 3011, the switch elements 801 and the sub-pixels 3011 of the pixel groups 301 have a one-to-one correspondence, and each of the switch elements 801 is electrically connected to the sub-pixel 3011; and a plurality of data lines 402, wherein the sub-pixels 3011 form a plurality of pixel strings 302, the sub-pixels 3011 of the each of the pixel strings 302 are included in different pixel groups 301, and each of the data lines 402 is electrically connected between the source driver chip 20 and the corresponding pixel string 302. As shown in FIG. 9, each of the second sub-messages includes a plurality of sixth sub-messages. The sixth sub-messages of the composite messages and the sub-pixels of the corresponding pixel groups have a one-to-one correspondence. Each of the first sub-recognition modules 901 is electrically connected between the source driver chip 20 and the corresponding pixel group 301. The switch elements 801 corresponding to the pixel groups 301 are turned on according to the first sub-messages. Therefore, each of the sixth sub-messages of the corresponding second sub-messages can be loaded to the corresponding sub-pixel 3011 by the corresponding data line 402.

Specifically, as shown in FIG. 8, a specific structure of each of the first sub-recognition modules 901 may be, but is not limited to, a AND gate. Because of the first sub-messages and the pre-stored address messages of the first sub-recognition modules 901, each of the data lines 402 can transmit the sixth sub-messages of the corresponding second sub-messages to the corresponding sub-pixels 3011 after the switch elements 801 corresponding to the corresponding pixel groups 301 are turned on. Taking a AND gate electrically connected to the pixel groups 301 in a first row as an example. The AND gate recognizes the first sub-messages and turns on the switch elements 801 corresponding to the first sub-messages. Therefore, the sixth sub-messages, such as "Data G1D1", "Data G1D2", and "Data G1D3", of the corresponding second sub-messages can be respectively transmitted to the sub-pixels 3011 in the first row.

It should be understood that, in the present embodiment, since the first sub-recognition modules 901 have a recognition function and each of the data lines 402 is electrically connected between the source driver chip 20 and the corresponding pixel strings 302. Corresponding sixth sub-messages can be transmitted to the corresponding sub-pixels 3011. Therefore, a gate driving circuit, a gate line, and a transistor electrically connected to the gate line can be omitted, thereby simplifying a driving structure of the sub-pixels 3011 in the display panel 100 and reducing a density of elements distributed in the driving structure. As such, cost for manufacturing the driving structure of the sub-pixels 3011 of the display panel 100 is reduced.

In one embodiment, as shown in FIG. 8, the display panel 100 further includes: a shift registers 50, wherein an input end of the shift register 50 is electrically connected to the source driver chip 20, and a first output end 501 of the shift register 50 is electrically connected to the first sub-recognition modules 901 to one-by-one load the first sub-messages to the data lines 402. A second output end 502 of the shift register 50 is electrically connected to the data lines 402 to one-by-one load the second sub-messages to the data lines 402.

Specifically, as shown in FIG. 8, the first sub-message and the second sub-message of each of the composite messages may be one-by-one transmitted to the first output end 501 and the second output end 502 of the shift register 50. Compared with the second output end 502, the first output end 501 of the shift register 50 can first load the first sub-messages and the second sub-messages. Thus, the first sub-messages can be loaded by the first output end 501 of the shift register 50, and the second sub-messages can be loaded by the second output end 502 of the shift register 50. These two situations can be achieved at a same time. According to the above description, the first output end 501 of the shift register 50 can load the first sub-messages of the composite messages to the first sub-recognition modules 901 to recognize the corresponding pixel groups 301. Thus, the corresponding switch elements 801 can be turned on. Furthermore, a plurality of sub-ports of the second output end 502 of the shift register 50 and the data lines 402 can have a one-to-one correspondence. Each of the data lines 402 is electrically connected between the corresponding sub-port and the corresponding pixel string 302. The sub-ports of the second output end 502 of the shift register 50 can load the sixth sub-messages of the corresponding second sub-messages to the sub-pixels 3011 of the corresponding pixel groups 301.

In one embodiment, as shown in FIG. 10, the main display panel 30 further includes: a plurality of pixel driver chips 3012, wherein each of the pixel groups 301 includes the sub-pixels 3011, the pixel driver chips 3012 and the sub-pixels 3011 of the pixel groups 301 have a one-to-one correspondence, and each of the pixel driver chips 3012 is electrically connected to the corresponding sub-pixel 3011. As shown in FIG. 11, each of the second sub-messages includes a plurality of ninth messages. The ninth messages of the composite messages and the sub-pixels 3011 of the corresponding pixel groups 301 have a one-to-one correspondence. Each of the ninth messages includes a plurality of a seventh sub-message and an eighth sub-message. The seventh sub-messages and the eighth sub-messages of the ninth sub-messages and the sub-pixels of the corresponding pixel groups have a one-to-one correspondence. Each of the pixel driver chips 3012 loads the corresponding eighth messages to the corresponding sub-pixel 3011 according to the seventh sub-messages.

Furthermore, as shown in FIG. 10, each of the pixel driver chips 3012 may be provided with a plurality of third sub-recognition modules 903. Each of the first sub-recognition modules 901 may be electrically connected to the corresponding third sub-recognition module 903 corresponding to the corresponding pixel group 301. It should be understood that, in the present embodiment, each of the first sub-recognition modules 901 compares the first sub-messages of the composite signal with the pre-stored address messages. The pre-stored address messages of each of the first sub-recognition modules 901 are the address messages of the pixel groups 301. If the first sub-messages transmitted to the first sub-recognition modules 901 and the pre-stored address messages are a same, the first sub-recognition modules 901 may load the second sub-messages to the pixel groups 301, and each of the third sub-recognition modules 903 may receive and recognize the seventh sub-messages of the corresponding ninth sub-messages. Thus, the corresponding eighth sub-messages can be loaded to the corresponding sub-pixels 3011. Similarly, in the present embodiment, a transistor electrically connected to the gate line can be omitted, thereby simplifying a driving structure of the sub-pixels 3011 in the display panel 100 and reducing a density of elements distributed in the driving structure. As such, cost for manufacturing the driving structure of the sub-pixels 3011 of the display panel 100 is reduced.

In one embodiment, as shown in FIG. 5, the display panel 100 further includes: the source driver chip 20, wherein the source driver chip 20 is electrically connected between the timing control chip 10 and the main panel body 30. The source driver chip 20 includes the recognition module 90. Specifically, the recognition module 90 may be embedded into the source driver chip 20. After the source driver chip 20 is electrically connected to the timing control chip 10 to obtain the composite signal, the source driver chip 20 can compare the first sub-messages with the pre-stored address message base. Furthermore, the recognition module 90 of the source driver chip 20 may include the first sub-recognition modules 901. Each of the first sub-recognition modules 901 of the driver chip 20 may compare the first sub-messages of the composite signal with the pre-stored address messages. If the first sub-messages transmitted to the first sub-recognition modules 901 and the pre-stored address messages are a same, the first recognition modules 901 may load the corresponding second sub-messages to the corresponding pixel groups 301.

Of course, as shown in FIG. 8, the recognition module 90 may also be independent from the source driver chip 20 and the main panel body 30. The recognition module 90 may be electrically connected between the source driver chip 20 and the main panel body 30, thereby comparing the first sub-messages of the composite signal with the pre-stored address messages. Furthermore, the recognition module 90 of the source driver chip 20 may include the first sub-recognition modules 901. Each of the first sub-recognition modules 901 of the driver chip 20 may compare the first sub-messages of the composite signal with the pre-stored address messages. If the first sub-messages transmitted to the first sub-recognition modules 901 and the of pre-stored address messages are a same, the first recognition modules 901 may load the corresponding second sub-messages to the corresponding pixel groups 301.

In one embodiment, as shown in FIG. 12, the main panel body 30 further includes: the pixel driver chips 3012. Each of the pixel groups 301 includes the sub-pixels 3011. The pixel driver chips 3012 and the sub-pixels 3011 of the pixel groups 301 have a one-to-one correspondence. Each of the pixel driver chips 3012 is electrically connected to the corresponding sub-pixel 3011. As shown in FIG. 13, each of the composite messages includes the sub-composite messages. Each of the sub-composite messages includes a fourth sub-message and a fifth sub-message. The fourth sub-messages form the corresponding first sub-messages, and the fifth sub-messages form the corresponding second sub-messages. Each of the pixel driver chips 3012 loads the corresponding fifth sub-messages to the corresponding sub-pixels 3011 according to the fourth sub-messages.

Specifically, as shown in FIG. 12 and FIG. 13, the composite messages and the pixel groups 301 may have a one-to-one correspondence. Furthermore, the sub-composite messages and the sub-pixels 3011 may have a one-to-one correspondence. Furthermore, the fourth sub-message of each of the composite sub-messages may denote an address of one of the corresponding sub-pixels 3011, and the fifth sub-message of each of the composite sub-message may denote a relevant voltage value that needs to be applied to the corresponding sub-pixels 3011 in one frame. For example, "00 . . . 01" may denote an address of the sub-pixel 3011 in a first row and a first column. "Data D1G1" may denote a relevant voltage value that needs to be applied to the sub-pixel 3011 in the first row and the first column. "00 . . . 10" may denote an address of the sub-pixel 3011 in the first row and the second column. "Data D1G2" may denote a relevant voltage value that needs to be applied to the sub-pixel 3011 in the first row and the second column.

Furthermore, as shown in FIG. 12, each of the pixel driver chips 3012 may be provided with a second sub-recognition module 902. The timing control chip 10 may be electrically connected to the second sub-recognition modules 902. Specifically, in the present embodiment, the timing control chip 10 generates the composite signal. The composite signal includes the fourth sub-messages and the fifth sub-messages having a one-to-one correspondence with the sub-pixels 3011. The composite signal may be transmitted to the pixel driver chips 3012 by the source driver chip 20. Furthermore, the second sub-recognition module 902 of each of the pixel driver chips 3012 may compare the fourth sub-messages with the pre-stored address messages. If the fourth sub-messages of the second sub-recognition modules 902 and the pre-stored address messages are a same, the second sub-recognition modules 902 may load the fifth sub-messages to the corresponding sub-pixels 3011. The second sub-recognition modules 902, the fourth sub-messages, and the fifth sub-messages can be referred to the above relevant description regarding the recognition module 900, the address messages, and the data messages.

It should be understood that, in the present embodiment, the timing control chip 10 generates the composite signal including the fourth sub-messages and the fifth sub-messages having a one-to-one correspondence with the sub-pixels 3011. The second sub-recognition module 902 of each of the pixel driver chips 3012 recognizes the fourth sub-messages to load the corresponding fifth sub-messages to the corresponding sub-pixels 3011. Therefore, a gate driving circuit, a gate line, and a transistor electrically connected to the gate line can be omitted, thereby simplifying a driving structure of the sub-pixels 3011 in the display panel 100 and reducing a density of elements distributed in the driving structure. As such, cost for manufacturing the driving structure of the sub-pixels 3011 of the display panel 100 is reduced.

In one embodiment, as shown in FIG. 14, the timing control chip 10 is configured to receive an initial signal generated by an external chip 60. The initial chip includes the second sub-messages. The timing control chip 10 is further configured to add the first sub-message before each of the second sub-messages, thereby converting the initial signal into the composite signal. It should be noted that, according to the above description, the second sub-messages may be the data messages of the sub-pixels 3011. The first sub-messages may be the address messages of the sub-pixels 3011. The initial signal transmitted to the timing control chip 10 and generated by the external chip 60 does not include the address messages of the sub-pixels 3011. Therefore, the sub-pixels 3011 need to be turned on by rows in cooperation between a gate driving circuit, a gate line, and a transistor.

It should be understood that, in the present embodiment, the timing control chip 10 adds the corresponding first sub-message before each of the second sub-messages, and the recognition module 90 compares the first sub-messages with the pre-stored address message base. Therefore, the corresponding second sub-messages can be loaded to the corresponding pixel groups 301. Therefore, a gate driving circuit, a gate line, and a transistor electrically connected to the gate line can be omitted, thereby simplifying a driving structure of the sub-pixels 3011 in the display panel 100 and reducing a density of elements distributed in the driving structure. As such, cost for manufacturing the driving structure of the sub-pixels 3011 of the display panel 100 is reduced.

In one embodiment, as shown in FIG. 14, the timing control chip 10 includes: a buffer module 101, wherein the buffer module 101 is electrically connected to the external chip 60 to obtain and storage the second sub-messages; and a process module 102, wherein the process module 102 is electrically connected to the buffer layer 101 to obtain the second sub-messages and add the second sub-message before the corresponding first sub-message. As such, the second sub-messages are converted into the corresponding composite messages.

It should be noted that, according to the above description, the external chip 60 generates the initial signal including the second sub-messages serially transmitted to the timing control chip 10. The timing control chip 10 needs to correspondingly add the first sub-message before each of the second sub-messages. A speed rate of the control chip 10 adding the first sub-messages is less than a speed rate of the external chip 60 generating the initial signal including the second sub-messages serially transmitted to the timing control chip 10. Therefore, in the present embodiment, the buffer module 101 is provided to cache the received second sub-messages. Every time the timing control chip 101 finishes correspondingly adding the first sub-message before the corresponding second sub-message, the buffer module 101 may transmit a next second sub-message to the timing control chip 10, thereby allowing the timing control chip 10 to add the first sub-message before the second sub-message. It should be understood that, the present embodiment can ensure that the timing control chip 10 orderly adds the corresponding first sub-message before each of the second sub-messages. Therefore, the speed rate of the control chip 10 adding the first sub-messages and the speed of the external chip 60 generating the initial signal including the second sub-messages serially transmitted to the timing control chip 10 can be a same. As such, reliability of the generated composite signal is prevented from being reduced due to inaccurate positions where the first sub-messages are added.

The present disclosure provides a display panel and a method of controlling a same. The method includes following steps: generating a composite signal, wherein the composite signal includes a plurality of composite messages, each of the composite messages includes a sub-message and a second sub-message, and first sub-messages of the composite messages and a plurality of pixel groups of the display panel have a one-to-one correspondence; and recognizing each of the first messages to load the corresponding second sub-messages to the corresponding pixel groups. In the present disclosure, the composite messages including the first sub-messages and the second sub-messages having a one-to-one correspondence with the sub-pixels are generated, and the second sub-messages are loaded to the corresponding sub-pixels according to the first sub-messages. Therefore, a gate driving circuit, a gate line, and a transistor electrically connected to the gate line can be omitted, thereby simplifying a driving structure of the sub-pixels in the display panel and reducing a density of elements distributed in the driving structure. As such, cost for manufacturing the driving structure of the sub-pixels of the display panel is reduced.

A display panel and a method of controlling a same have been described in detail with embodiments provided by the present disclosure which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A display panel, comprising:

a timing control chip configured to generate a composite signal, wherein the composite signal comprises a plurality of composite messages, and each of the composite messages comprises a first sub-message and a second sub-message;

a main panel body, wherein the main panel body comprises a plurality of pixel groups, and the pixel groups and the plurality of first sub-messages of the composite messages have a one-to-one correspondence; and a recognition module, wherein the timing control chip is electrically connected to the main panel body to obtain the composite messages, and the recognition module recognizes each of the first sub-messages to load the corresponding second sub-messages to the corresponding pixel groups;

wherein the recognition module comprises:

a plurality of first sub-recognition modules, wherein the first sub-recognition modules are electrically connected to the timing control chip, the first sub-recognition modules, the composite messages, and the pixel groups have a one-to-one correspondence, each of the first sub-recognition modules is electrically connected to the corresponding pixel group, and each of the first sub-recognition modules recognizes each of the first sub-messages to load the corresponding second sub-messages to the corresponding the pixel groups;

wherein the main panel body comprises:

a plurality of sub-data lines, wherein each of the pixel groups comprise a plurality of sub-pixels, and the sub-data lines and the sub-pixels of the pixel groups have a one-to-one correspondence;

wherein each of the second sub-messages comprises a plurality of third sub-messages, and the third sub-messages of the composite messages and the sub-pixels of the corresponding pixel groups have a one-to-one correspondence; and wherein each of the first sub-recognition modules is electrically connected to the corresponding sub-data line to load each of the corresponding third sub-messages to the corresponding sub-pixel according to the first sub-messages.

2. A display panel, comprising:

a timing control chip configured to generate a composite signal, wherein the composite signal comprises a plurality of composite messages, and each of the composite messages comprises a first sub-message and a second sub-message;

a main panel body, wherein the main panel body comprises a plurality of pixel groups, and the pixel groups and the plurality of first sub-messages of the composite messages have a one-to-one correspondence; and a recognition module, wherein the timing control chip is electrically connected to the main panel body to obtain the composite messages, and the recognition module recognizes each of the first sub-messages to load the corresponding second sub-messages to the corresponding pixel groups;

wherein the recognition module comprises:

a plurality of first sub-recognition modules, wherein the first sub-recognition modules are electrically connected to the timing control chip, the first sub-recognition modules, the composite messages, and the pixel groups have a one-to-one correspondence, each of the first sub-recognition modules is electrically connected to the corresponding pixel group, and each of the first sub-recognition modules recognizes each of the first sub-messages to load the corresponding second sub-messages to the corresponding the pixel groups;

wherein the display panel comprises:

a source driver chip, wherein the source driver chip is electrically connected between the timing control chip and the main panel body;

a plurality of switch elements, wherein each of the pixel groups comprises a plurality of sub-pixels, the switch elements and the sub-pixels of the pixel groups have a one-to-one correspondence, and each of the switch elements is electrically connected to the corresponding sub-pixel; and a plurality of data lines, wherein the sub-pixels form a plurality of pixel strings, the sub-pixels of each of the pixel strings are included in different pixel groups, and each of the data lines is electrically connected between the source driver chip and the corresponding pixel string;

wherein each of the second sub-messages comprises a plurality of sixth sub-messages, and the sixth sub-messages of the composite messages and the sub-pixels of the corresponding pixel groups have a one-to-one correspondence; and wherein each of the first sub-recognition modules is electrically connected between the source driver chip and the corresponding pixel group, the switch elements of the corresponding pixel groups are turned on according to the first sub-messages to load each of the sixth sub-messages of the second sub-messages to the corresponding sub-pixels by the corresponding data lines.

3. The display panel of claim 2, wherein the display panel comprises:

a shift register, wherein an input end of the shift register is electrically connected to the source driver chip, a first output end of the shift register is electrically connected to the first sub-recognition modules to one-by-one load the first sub-messages to the first recognition modules, and a second output end of the shift register is electrically connected to the data lines to one-by-one load the second sub-messages to the data lines.

4. A display panel, comprising:

a timing control chip configured to generate a composite signal, wherein the composite signal comprises a plurality of composite messages, and each of the composite messages comprises a first sub-message and a second sub-message;

a main panel body, wherein the main panel body comprises a plurality of pixel groups, and the pixel groups and the plurality of first sub-messages of the composite messages have a one-to-one correspondence; and a recognition module, wherein the timing control chip is electrically connected to the main panel body to obtain the composite messages, and the recognition module recognizes each of the first sub-messages to load the corresponding second sub-messages to the corresponding pixel groups;

wherein the recognition module comprises:

a plurality of first sub-recognition modules, wherein the first sub-recognition modules are electrically connected to the timing control chip, the first sub-recognition modules, the composite messages, and the pixel groups have a one-to-one correspondence, each of the first sub-recognition modules is electrically connected to the corresponding pixel group, and each of the first sub-recognition modules recognizes each of the first sub-messages to load the corresponding second sub-messages to the corresponding the pixel groups;

wherein the main panel body comprises:

a plurality of pixel driver chips, wherein each of the pixel groups comprises a plurality of sub-pixels, the pixel driver chips and the sub-pixels of the pixel groups have a one-to-one correspondence, and each of the pixel driver chips is electrically connected to the corresponding sub-pixel;

wherein each of the second sub-messages comprises a plurality of ninth messages, the ninth messages of the composite messages and the sub-pixels of the corresponding pixel groups have a one-to-one correspondence, each of the ninth messages comprises a seventh sub-message and an eighth sub-message, and the seventh sub-messages and the eighth sub-messages of the nine messages and the sub-pixels of the corresponding pixel groups have a one-to-one correspondence; and wherein each of the pixel driver chips loads the corresponding eighth sub-messages to the corresponding sub-pixels according to the seventh sub-messages.

5. The display panel of claim 1, wherein the timing control chip is configured to receive an initial signal generated by an external chip, the initial signal comprises the second sub-messages, and the timing control chip is configured to add corresponding first sub-message before each of the second sub-messages to convert the initial signal into the composite signal.

6. The display panel of claim 1, wherein the timing control chip comprises:

a buffer module, wherein the buffer module is electrically connected to a control chip to obtain and storage the second sub-messages; and a process module, wherein the process module is electrically connected to the buffer module to obtain the second sub-messages, and the process module is configured to add the corresponding first sub-message before each of the second sub-messages to convert the second sub-messages into the corresponding composite messages.

7. The display panel of claim 1, wherein the first sub-messages correspond to addresses of the corresponding pixel groups.

8. The display panel of claim 1, wherein the second sub-messages correspond to voltages applied to the corresponding pixel groups.

9. A method of controlling a display panel, applied to the display panel of claim 1, the method comprising following steps:

generating a composite signal, wherein the composite signal comprises a plurality of composite messages, each of the composite messages comprises a first sub-message and a second sub-message, and the first sub-messages of the composite messages and the plurality of pixel groups of the display panel have a one-to-one correspondence; and recognizing each of the first sub-messages to load the corresponding second sub-messages to the corresponding pixel groups;

wherein the step of recognizing each of the first sub-messages to load the corresponding second sub-messages to the corresponding pixel groups comprises a following step:

loading each of the corresponding third sub-messages to the corresponding sub-pixel according to the first sub-messages.

10. A method of controlling a display panel, applied to the display panel of claim 2, the method comprising following steps:

generating a composite signal, wherein the composite signal comprises a plurality of composite messages, each of the composite messages comprises a first sub-message and a second sub-message, and the first sub-messages of the composite messages and the plurality of pixel groups of the display panel have a one-to-one correspondence; and recognizing each of the first sub-messages to load the corresponding second sub-messages to the corresponding pixel groups;

wherein the step of recognizing each of the first sub-messages to load the corresponding second sub-messages to the corresponding pixel groups comprises a following step:

turning on the switch elements corresponding to the corresponding pixel groups according to the first sub-messages, and loading each of the sixth sub-messages of the corresponding second sub-messages to the corresponding sub-pixels by a plurality of corresponding data lines.

11. The method of claim 10, wherein the step of recognizing each of the first sub-messages to load the corresponding second sub-messages to the corresponding pixel groups comprises a following step:

one-by-one loading the first sub-messages to recognize the first sub-messages, and one-by-one loading the second sub-messages to the data lines.

12. A method of controlling a display panel, applied to the display panel of claim 4, the method comprising following steps:

generating a composite signal, wherein the composite signal comprises a plurality of composite messages, each of the composite messages comprises a first sub-message and a second sub-message, and the first sub-messages of the composite messages and the plurality of pixel groups of the display panel have a one-to-one correspondence; and recognizing each of the first sub-messages to load the corresponding second sub-messages to the corresponding pixel groups;

wherein the step of recognizing each of the first sub-messages to load the corresponding second sub-messages to the corresponding pixel groups comprises a following step:

loading the corresponding eighth sub-messages to the corresponding sub-pixels according the seventh sub-messages.

13. The method of claim 9, wherein the step of generating the composite signal comprises following steps:

receiving an initial signal, wherein the initial signal comprises the second sub-messages; and adding the corresponding first sub-message before each of the second sub-messages to convert the initial signal into the composite signal.

* * * * *